(Model.)  
6 Sheets—Sheet 1.

P. F. HODGES.
AUTOMATIC GRAIN BINDER.

No. 312,469. Patented Feb. 17, 1885.

Witnesses:  
Inventor:  
Pliny F Hodges (Model.) 6 Sheets—Sheet 2.
P. F. HODGES.
AUTOMATIC GRAIN BINDER.

No. 312,469. Patented Feb. 17, 1885.

Witnesses:
O. W. Bond
Albert H. Adams

Inventor:
Pliny F. Hodges (Model.)
P. F. HODGES.
AUTOMATIC GRAIN BINDER.
No. 312,469. Patented Feb. 17, 1885.
6 Sheets—Sheet 3.
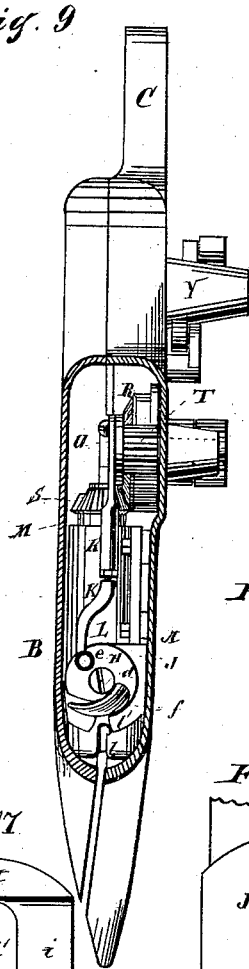
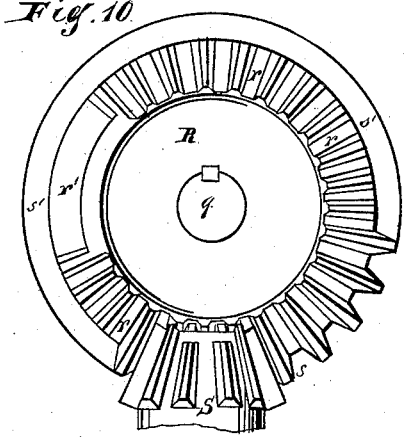
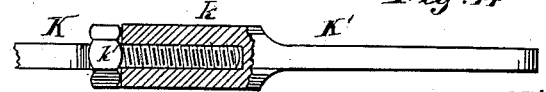
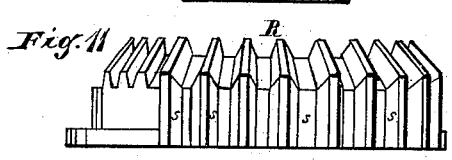
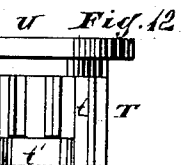
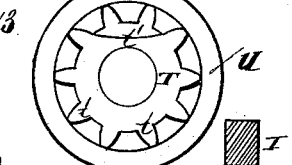
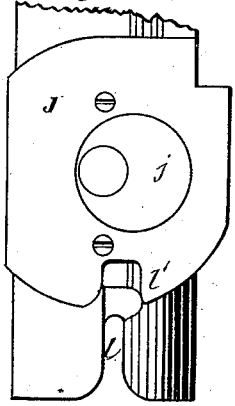
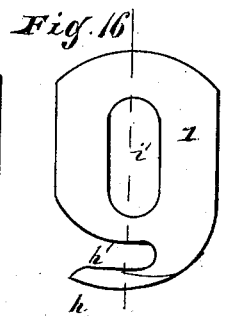
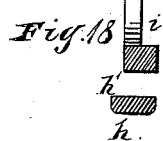
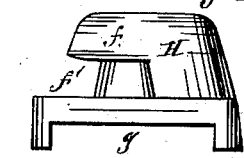
Witnesses:
O. W. Bond
Albert H. Adams.
Inventor:
Plenry F. Hodges (Model.) P. F. HODGES. 6 Sheets—Sheet 4.
AUTOMATIC GRAIN BINDER.
No. 312,469. Patented Feb. 17, 1885.
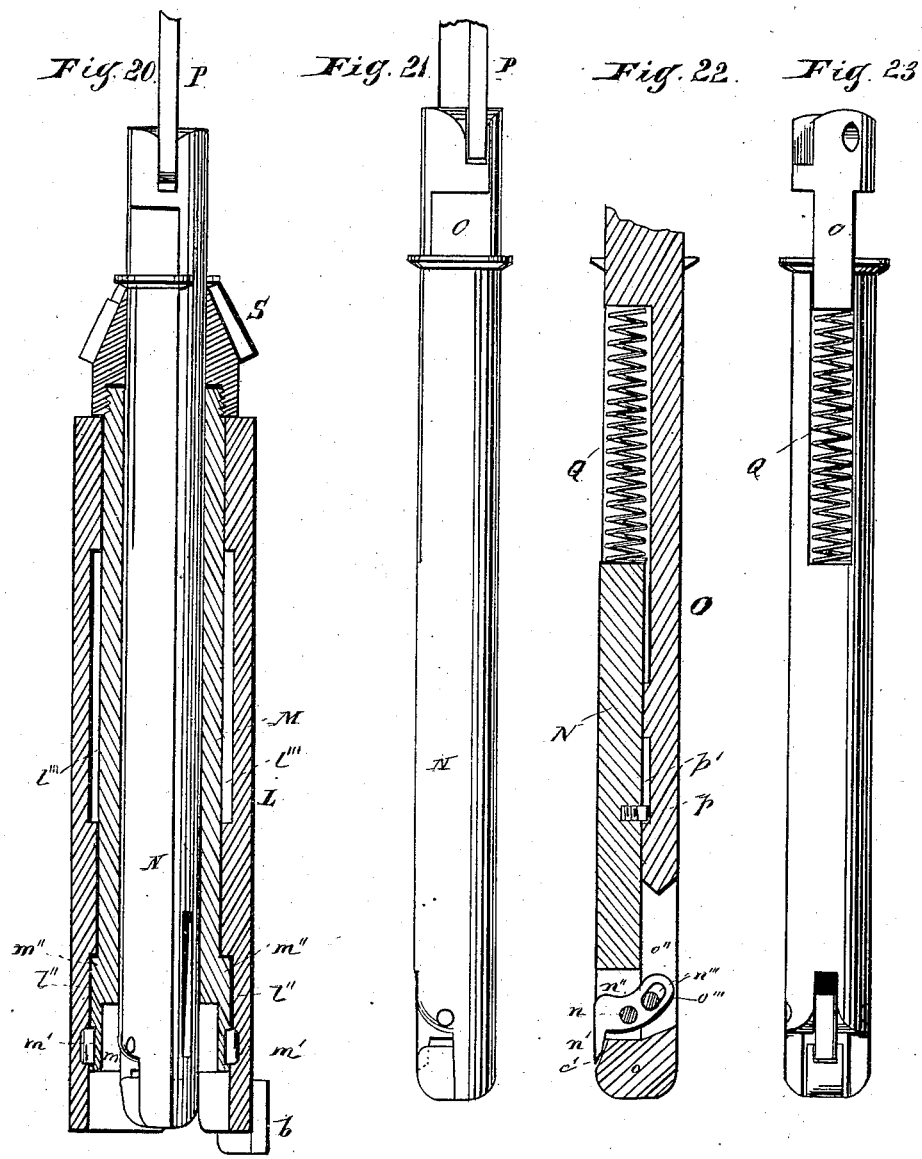

(Model.)
P. F. HODGES.
AUTOMATIC GRAIN BINDER.
No. 312,469.
6 Sheets—Sheet 5.
Patented Feb. 17, 1885.
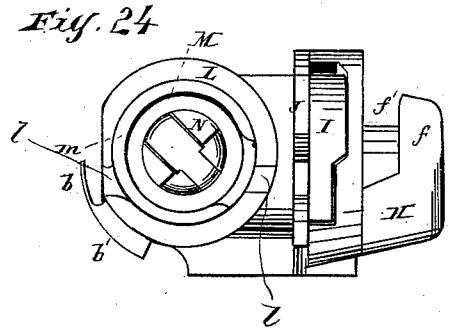
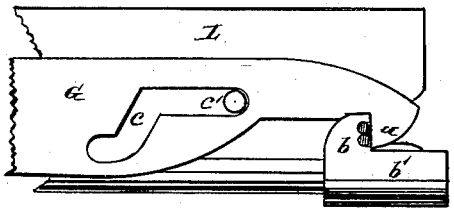
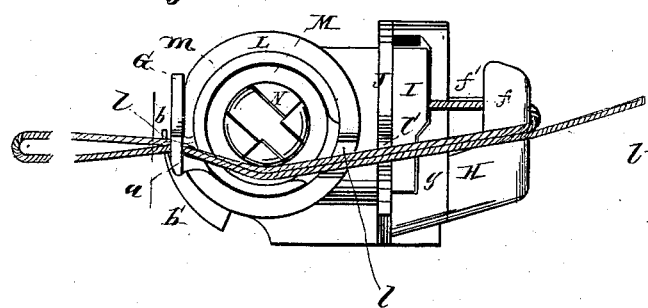
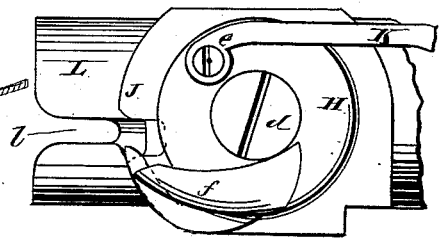
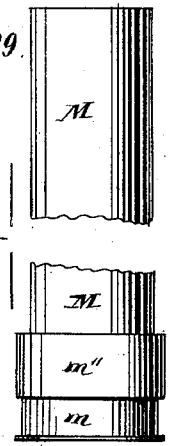
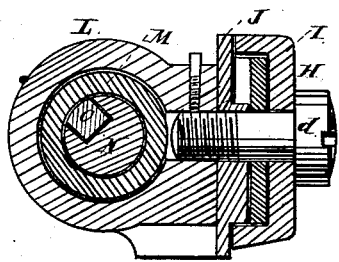
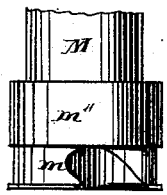
Witnesses:
O. W. Bond
Albert H. Adams.
Inventor:
Pliny F. Hodges (Model.)

P. F. HODGES.
AUTOMATIC GRAIN BINDER.

No. 312,469. Patented Feb. 17, 1885.

Witnesses:
O. W. Bond
Albert H. Adams

Inventor:
Pliny F. Hodges

UNITED STATES PATENT OFFICE.

PLINY F. HODGES, OF CHICAGO, ILLINOIS.

AUTOMATIC GRAIN-BINDER.

SPECIFICATION forming part of Letters Patent No. 312,469, dated February 17, 1885.

Application filed December 2, 1880. (Model.)

*To all whom it may concern:*

Be it known that I, PLINY F. HODGES, residing at Chicago, in the county of Cook and State of Illinois, and a citizen of the United States, have invented new and useful Improvements in Automatic Grain-Binders, of which the following is a full description, reference being had to the accompanying drawings. in which—

Figure 1:
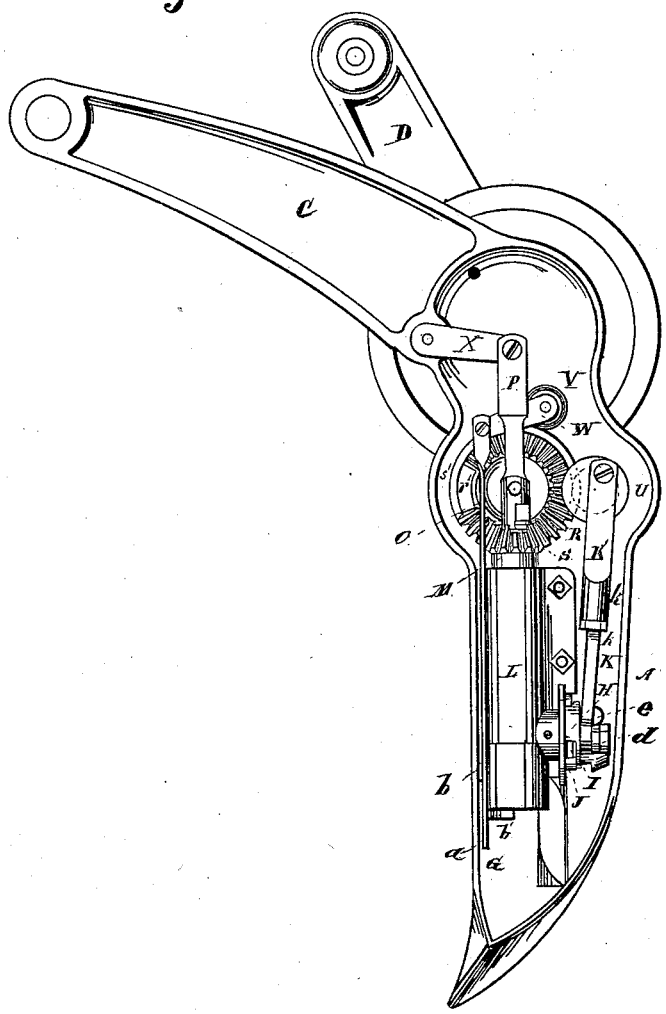
Figure 2:
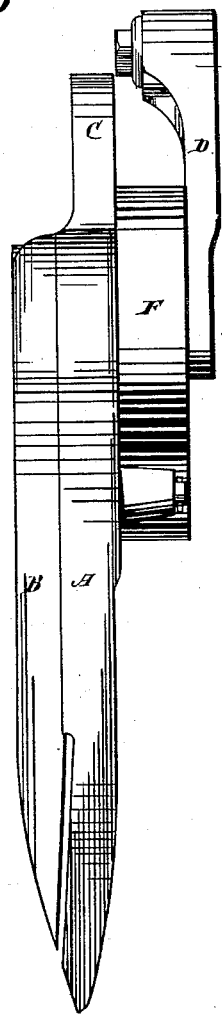
Figure 5:
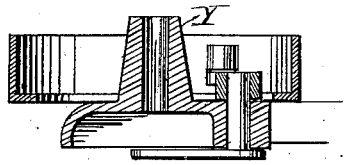
Figure 4:
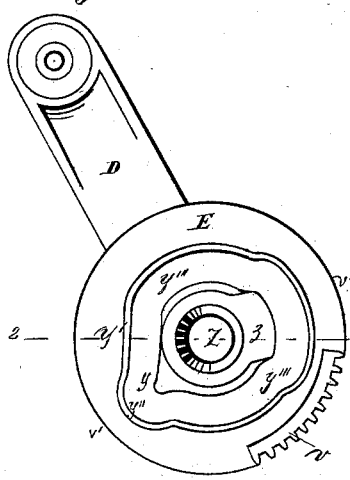
Figure 3:
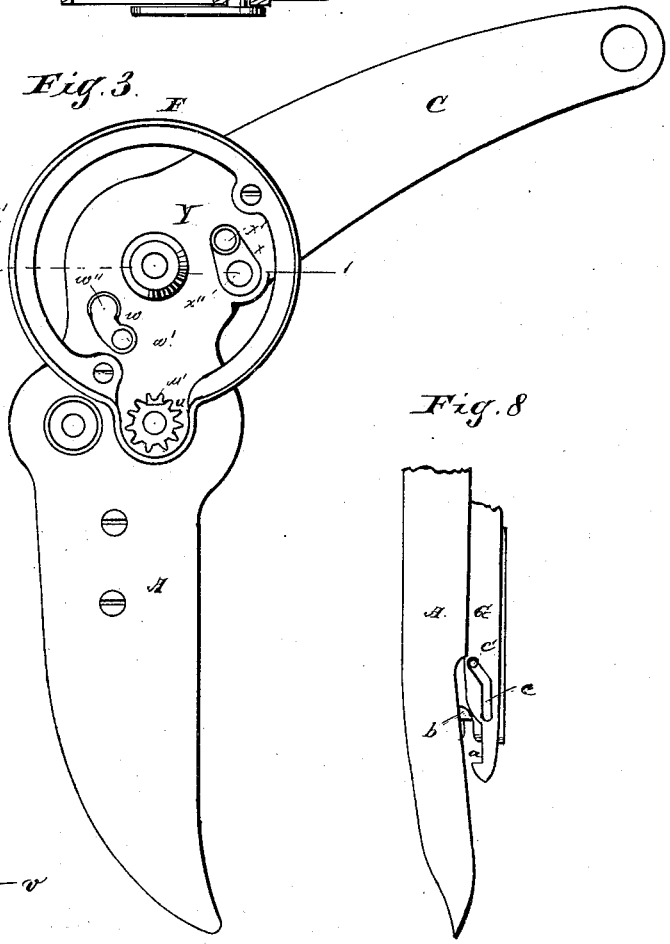
Figure 8:
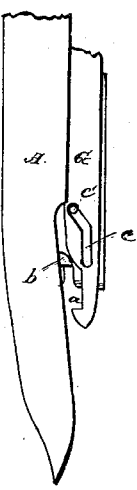
Figure 6:
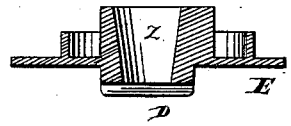
Figure 7:
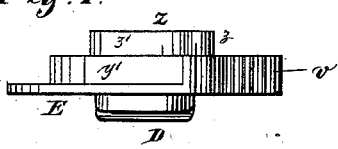
Figure 31:
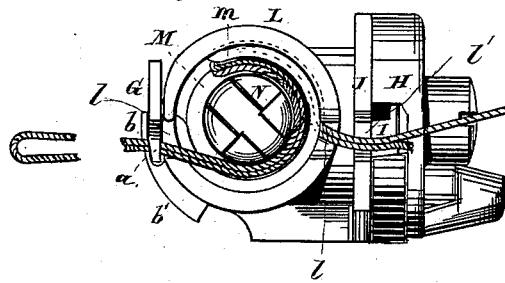
Figure 34:
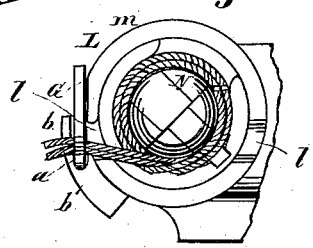
Figure 32:
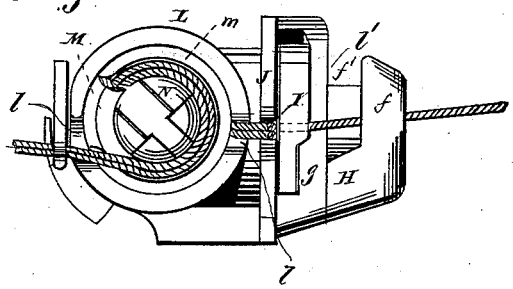
Figure 33:
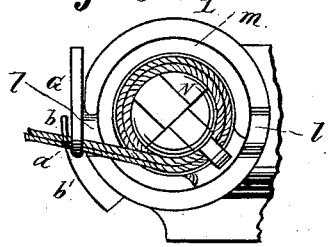
Figure 35:
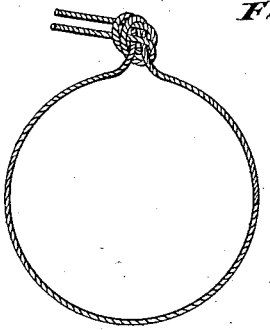

Figure 1 is a side elevation with the cover removed, showing the interior face of the main portion or body of the binding-arm and the location and arrangement of the knot-tying mechanism; Fig. 2, an edge elevation of the binding-arm complete; Fig. 3, a side elevation with the crank removed, showing the exterior face of the body of the binding-arm and the location and arrangement of the stop-pinion and cranks for operating the mechanism; Fig. 4, a side elevation of the crank, showing the interior face of its head; Fig. 5, a detail in cross-section on line 1 of Fig. 3; Fig. 6, a detail in cross-section on line 2 of Fig. 4, showing the bearing for the arm, trunnion, or pivot and the cam-groove and cam on the head of the binding-arm crank; Fig. 7, an end view of the binding-arm crank; Fig. 8, a detail showing an edge view of the point of the binding-arm and a side view of the cord catching and gripping devices; Fig. 9, an edge elevation of the binding-arm with the crank removed and the body and cover sectioned to show the knot-tying mechanism; Figs. 10 and 11, details, being respectively a face and side view of the main driving-pinion; Figs. 12 and 13, details, being respectively a side and end view of the stop-pinion which operates the cord cutting and holding devices. Fig. 14 is a detail view showing the pitman for rocking the head; Figs. 15, 16, 17, 18, and 19, details of the cord cutting and holding devices; Fig. 20, a longitudinal section showing the outer casing or barrel for the revolving looper, and the reciprocating spindle for drawing the ends of the cord through the loop; Figs. 21, 22, and 23, details showing the construction of the spindle for catching the cord ends and drawing them through the loop; Fig. 24, an end view of the knot-tying and the cord cutting and holding devices; Fig. 25, a detail showing the cord catching and gripping devices in position when grasping the strands while the knot is being tied; Fig. 26, an end view of the knot-tying and cord cutting and holding devices, showing the cord in position to commence operation; Fig. 27, a detail showing the cord cutter and holder open after releasing the cord; Fig. 28, a cross section through the knot-tying and cord cutting and holding devices; Figs. 29 and 30, details of the looper; Fig. 31, an end view of the knot-tying and cord cutting and holding devices, showing the cord in position with the cutter open and the loop partly formed; Fig. 32, an end view of the knot-tying and cord cutting and holding devices, showing the cord in position and the loop partly formed with the cutter closed and the cord severed; Fig. 33, an end view of the knot-tying devices, showing the loop formed and the strands ready to cross, with the spindle-jaws open for the cord to pass between them; Fig. 34, an end elevation of the knot-tying devices, showing the strands of the loop crossed and between the spindle-jaws, with the jaws ready to close and draw the ends through the loop and tie the knot; Fig. 35, a detail showing the form of knot.

This invention relates to devices for automatically severing, catching, and tying a cord or string for binding grain into bundles in that class of self-binders in which the grain, after being cut by the machine, is delivered to a binding apparatus located on the machine, the binding-arm of which acts to separate the grain into gavels, and carry the cord or string around each gavel into position for the cutting, catching, and tying devices to act and complete the work of binding, after which the bundle is discharged, making the entire binding operation an automatic or self-acting one; and has for its object to improve and simplify the arrangement, construction, and operation of the cord severing and catching and the knot-tying devices, and the devices or means by which they are operated, and produce a more perfect, reliable, and efficient mechanism, the several parts of which will act in harmony, and in the proper relation to each other, and do their work in the most effective manner and at the time required; and its nature consists in providing a vibrating reciprocating bar carrying a catch or jaw, between which and a stationary catch or jaw the cord-strands will be clamped at a point between the bundle and the knot-tying device, and held while the knot is being tied, and released at the completion of the tying to allow the bundle to be discharged; in providing a rocking or oscillating head having a hook or horn, and an opening between the hook or horn and the face of the head for catching and guiding the binding cord or string, so as to be severed and caught by the cutting device, and regulate the length of the tying ends; in providing a sliding plate located and operating in a recess of the oscillating head, and having a slot or opening to receive the binding-cord, and a lip or projection, one edge of which acts to sever the cord and the other to clamp the cord between the hook and the side of the head; in providing a stationary plate, on which the head is pivoted, having a circular projection located one side of the pivot of the head to engage shoulders formed on the sliding plate and act as an eccentric to reciprocate the plate; in providing an adjustable pitman or rod for regulating the oscillating movement of the head; in providing a crank, disk, or wheel operated by a stop-pinion for driving the adjustable pitman or rod to operate the oscillating head; in providing a stationary casing adapted to receive and form a bearing for a revolving looper, and having slots or openings for the passage of the binding cord or string to be grasped or caught by the sleeve and formed into a loop at the end of the sleeve around the interior of the casing; in providing the revolving looper with a hook to catch the strands of the cord passing around the bundle as the cord is severed and carry them around the interior of the casing to form a loop through which the ends can be drawn to complete the knot, the act of forming the loop also crossing the strands to draw the ends through the loop; in providing a divided spindle located in the revolving looper and having a reciprocating movement, the secondary section of which has a reciprocating movement independent of the main section, and is provided with a head or jaw between which and the point or jaw of a pivoted finger or latch having a jaw or clamp and carried by the main section of the spindle the ends of the strands are caught to be carried through the loop; in providing the finger with a slot to receive a pin on the secondary sliding section, so that the movements of the section will rock the finger and thus open and close the jaws or clamps to receive the strands and clamp them tightly to be drawn through the loop; in providing a coil-spring located in a slot formed in the main section of the spindle for retaining the main section projected; in the peculiar construction and arrangement of the casing, the revolving looper, and the divided spindle, in their relation to each other and the cord cutting and catching devices; in providing a beveled pinion located on the end of the revolving looper and having an intermittent revolving movement for revolving the looper and forming the knot-loop; in providing a link or pitman pivoted at one end to the secondary section of the divided spindle, and at the other end to a reciprocating crank for giving the spindle a reciprocating movement; in providing a reciprocating crank or arm connected with the spindle-crank and operated by a cam or cam-groove for imparting movement to the divided spindle; in providing a reciprocating crank pivoted to the end of the vibrating reciprocating bar for advancing the bar, and a coil-spring acting on the crank for returning the crank and bar; in providing a reciprocating crank or arm connected with the crank of the vibrating reciprocating bar, and operated by a cam for advancing the bar; in providing a cam-groove located on the head of a revolving crank for operating the divided spindle and cord-retaining bar by their respective cranks; in providing a main driving-pinion having beveled cogs on its face to drive the pinion of the revolving looper, and cogs on its side or edge to drive the crank-disk or eccentric pinion; in the peculiar construction of the main pinion and the arrangement of its cogs, and delay-surfaces for imparting movement to and preventing movement of the revolving looper and the rocking head at the proper time in relation to each other and the other devices; in providing a stop-pinion for giving the main or driving pinion an intermittent rotary movement, as required for operating the revolving looper and the rocking head; in the peculiar construction and arrangement of the stop-pinion, the main pinion, the revolving looper and its pinion, the rocking head and its pinion, the cam-flange and the crank, the retaining-bar, and the divided spindle, in their relation to each other, to produce unity and certainty in performing their several functions; and in the peculiar construction and form of the binding-arm to adapt it to receive and support the several mechanisms in their relation to each other.

The mechanism can be attached to the binding-arm or to the binding-table. As shown, it is attached to the binding-arm, and the crank that vibrates the arm is made to perform the office of driving the several devices. When attached to a table, the crank for driving the mechanism is to be revolved in any suitable manner, so that its movement will coincide with the movements of the cord-arm, and when so attached any form of cord-arm that will carry the cord around the bundle to the mechanism can be used. In either form of attachment, the crank, in so far as it relates to the means for operating the devices, is to have the same principle of construction.

The body A and extension C may be of the form shown in Figs. 1, 2, and 3, or any other suitable form for the location of the cord tying, cutting, and holding devices and their operating mechanisms in the body A, when such devices are carried by the arm, and for hanging the arm so that it can have a vibratory or reciprocating movement to carry the binding-cord around the bundle. As shown, the body and extension are cast or otherwise formed from a single piece, the extension being somewhat curved, the body enlarged at two points at its upper end, its central portion straight, or nearly so, and its point slightly curved and sharp to enter and pass through the grain for the bundle. The body A is provided with a side flange extending from near its extreme point around its entire edge, forming a central cavity, in which are located the cord tying, cutting, and holding devices and their operating mechanism.

The cover B is cast or otherwise formed into a shape corresponding to the flanged portion of the body A, and its entire edge is provided with side flanges coinciding with the side flanges of A, so that when the two parts are together an interior chamber is formed for the reception of the several devices, and a smooth exterior face is presented for the passage of the arm through the grain.

The crank D has a circular head or enlargement, E, at one end, and its other end is adapted to be attached or connected to a revolving shaft or other suitable driving device for revolving the crank. The head or enlargement E at its center is provided with a hub or bearing, Z, having a central opening to receive the trunnion or pivot Y of the binding-arm. This hub Z is enlarged at its base, so as to form a ledge or ring, making the lower or inner portion of the hub of greater diameter than the upper or outer portion, and is provided on its exterior face with two cams, $y$ $z$, located at opposite ends of the hub, and on opposite sides thereof, but not in direct line, $y$ being to one side of a line passing through the centers of the cam $z$ and the hub. The cam $y$ projects out from the lower or ledge portion of the hub, and is wedge-shaped, or has inclined sides and a rounded point, one side having a longer inclination than the other, as shown in Fig. 4; and the cam $z$ projects out from the periphery $z'$ of the upper portion of the hub, and has two faces or sides standing at a slight inclination, and an outer circular face or side, as shown in Fig. 4, which face is flush, or nearly so, with the periphery of the ledge, and extends the distance between the inclined sides. The peripheries of the ledge or ring and the upper portion of the hub from the base of the cams $y$ $z$ are circular, with the center of the hub as the center of the circles. Around the hub Z, on the head E, is a flange, $y'$, having an interior face which coincides with the exterior face of the ledge or ring and forms a cam-groove, $y''$ $y'''$, between the respective faces.

When the crank D is used as a means for operating the binding-arm, its upper end is to be suitably attached to a revolving shaft, and a conical-shaped trunnion or pivot, Y, formed on the binding-arm at the center of the upper enlargement, is to be inserted in the conical opening in the bearing or hub, the pivot Y having a central opening for the passage of a bolt which attaches the arm to the crank, and the suspension of the arm is completed by connecting the extension C, by a link or otherwise, to a support, so that as the crank revolves the arm will be actuated.

On the periphery of the head E is a flange the outer face of which is flush with the periphery of the head, and is provided with cogs, so as to form a cogged segment, $v$, having the requisite number of cogs to engage the pinion $u$ and cause it to make one complete revolution in passing the length of the segment. The cogs of this segment $v$ extend from the top of the flange to the under side of the head E, and the periphery of the head from each end of the segment forms a stop or delay-surface, $v'$, which comes in contact with the cut-away portion $u'$ of the pinion $u$, and keeps the pinion from revolving except when engaged by the cogged segment.

The housing F is formed by a flange or ring attached, as shown, to the body A and extension C, so as to close the opening between the head E and the body A around the periphery or edge of the head, the edge of the flange forming a bearing for the head E. This flange or ring is formed as shown in Fig. 3, and incloses the pinion $u$ and devices on the head E and body A, and prevents grain, straw, and other substances from entering and interfering with the revolving of the head and operation of the inclosed devices.

The bar G forming the cord-catcher is parallel with and adjacent to the barrel or knotter-casing L, and is pivotally attached at one end to the outer end of a crank or arm, W, the other end of which crank is firmly attached to or has formed thereon a journal or pivot, $w''$, which has its bearing in the body A and projects through the body, and has attached to its projecting end a short crank or arm, $w$, on the outer end of which is an anti-friction roller, $w'$, so located and arranged as to bear against the circular face $z$ and come in contact with and ride over the cam $z'$ as the crank-head E is revolved. The free end of the bar G has a jaw or shoulder, $a$, formed on the edge adjacent to the cord, and a jaw or shoulder, $b$, is formed on the piece $b'$, which piece, as shown, is attached to the end of the barrel or case L, but may be attached to the body A, or in some other suitable manner to bring the jaws $a$ $b$ in line with each other and in such relation that the strands of the cord will pass from the bundle to the knotter between them. In the free end of this bar G is a slot, $c$, having a straight portion and an inclined portion, as shown in Fig. 8, which slot receives and engages with a pin, $c'$, located, as shown, on the casing L, and corresponds in length to the length of stroke of the crank W. The crank W is depressed or thrown down by the action of a spring, V, coiled around the stud or bearing for the journal $w''$, or located in some other suitable manner, one end of the spring being attached to the crank and the other to the body, and is elevated or thrown up and held in that position by the action of the roller $w'$, riding upon the acting inclined face and over the curved face of the cam $z'$, which roller, when the crank is depressed, bears against the curved face $z'$ and limits the point of depression of the crank. These movements of the crank W impart a reciprocating movement to the bar G, advancing and receding the free end thereof, and this end at the same time is given an oscillating or vibrating movement by the action of the cam-slot $c$ and pin $c'$. When advanced, the free end of G will project beyond the end of barrel or casing L above and out of the way of the cord, and will remain in that position while the crank W is depressed, the slot $c$ being engaged with the pin $c'$ at the end of its inclined portion, keeping the end of G raised, and when receded the free end of G will be drawn down and held by the cam action of the slot against the pin $c'$, closing the jaws $a\,b$ and catching the cord between them. Fig. 8 shows the free end of G advanced and the jaws open for the passage of the cord, and Fig. 25 shows the end receded and the jaws closed, the jaws remaining closed during the time the crank is maintained in an elevated position.

The rocking head H of the cord holder and cutter, as shown, is formed from a circular plate or disk having a central projection or hub to insure a firm bearing. The horn or hook $f$ has a curved exterior face, and is located on the exterior face of the head or plate H, and may be an independent piece attached to the head by screws or otherwise, or may be formed with the head or plate. Between the horn or hook $f$ and the face of the head is an opening, $f'$, and the point of the horn projects slightly beyond the periphery of the plate, the arrangement being such with reference to the cutting and holding plate for the cord that when the head is rocked forward the cord will pass over the end of the hook or horn and enter the opening $f'$ on the return movement of the head, the object being to pass the cord around the horn to furnish a sufficient length of cord to form the loop without straining the mechanism or the cord, the end of the main cord being released and drawn through the opening $f'$ and around the horn, while the main cord is drawn from the spool before the cord is again severed and while the loop is being formed. The form of the head and its hook or horn is shown in Figs. 19, 24, and 27.

The cutting and holding plate I is oblong in form, with straight sides and curved ends, and is located in a recess or channel formed in the interior face of the head H, and has a reciprocating sliding movement in its channel. The acting end of this plate is provided with a point, $h$, between which and the body of the plate is an opening or slot, $h'$, and the corner of the plate adjacent to the opening is curved to conform to the circle of the head H. The side of the point $h$ adjacent to the head H projects beyond the plane of the plate I and forms a lip, and the edge or periphery of the head in line with the lip is made straight to correspond with the straight inner edge or face of the lip, the adjacent edges of the lip and head forming jaws, between which the cord will be caught and held when the plate I is receded. This plate I has a transverse channel or recess, $i$, forming shoulders at the ends of the plate, and at its center is provided with an elongated opening, $i'$, to permit it to slide back and forth. The form of this plate I and its point $h$ is shown in Figs. 16, 17, and 18, and its groove or channel $g$ is shown in Fig. 19, and its location in relation to the hook or horn $f$ and opening $f'$ is shown in Figs. 24 and 26.

The supporting or bearing plate J is attached to the barrel or casing L by screws or otherwise, so as to be in a fixed position, and has a central circular opening in line with a screw-threaded opening in the casing for the passage of the bolt or pin $d$, the end of which is screw-threaded to enter the screw-threaded opening in the casing. This bolt or pin $d$ retains the head H and plate I in contact with the plate J, and supports the head so that it can have a rocking movement on the bolt or pin $d$ as a center, the bolt passing through a suitable opening in the head and the opening $i'$ in the plate I. The plate J is formed as shown in Fig. 15, and at one side of its center is provided with a stud or projection, $j$, corresponding in diameter to the width of the recess $i$, which stud enters the recess and acts as an eccentric to advance and recede the plate as the head is rocked, the forward rock of the head advancing the plate and the return movement receding it; and the plate I is advanced just far enough to bring the slot or opening $h'$ with its inner edge flush or in line with the periphery of the head at the opening $h'$, leaving the opening $h'$ clear for the passage of the binding-cord. In the edge of the plate J, at a point crossed by the point $h$ in its rocking movement, is formed a slot or opening, $l'$, which receives the binding-cord and the plate, at the side of the opening, against which the cord will be pressed by the return movement of the rocking head, and point $h$ is provided with a cutting-edge, so that the draw action of the point will sever the cord between the plate I and point $h$, the end of the main cord at the same time being caught between the opposite side of the point and the head.

The rocking movement is imparted to the head H by the pitman K K′, one end of which is attached to the head by the pin or pivot $e$, and the other is attached to a crank or wrist pin on the disk or plate U, which plate is attached to or formed with the pinion T, the revolving of the pinion reciprocating the pitman and rocking the head; and in order that the head shall have a correct movement the pitman is made in two pieces or sections, K K′, the section K having a screw-threaded end which enters a screw-threaded opening in the head $k$ of the section K′, so that the pitman can be made longer or shorter, and adjusted to the exact point to give the required rock, and no more or less, to the head H, and when adjusted the set-nut $k'$ is brought against the end of the head $k$ to lock the sections firmly and prevent them from becoming displaced. By this arrangement the head can be accurately and precisely adjusted to sever and hold various sizes of cord, and to allow the cord to draw from the loop.

The barrel or casing L, as shown, has an exterior of tubular form, with a projecting flange or wing for attachment to the body A, by screws or otherwise, and a projection on one side for attachment of the plate J. This case has a central circular longitudinal opening corresponding in diameter and shape to the exterior diameter and shape of the looper M, and forms a bearing for the looper, and its mouth or cord end is provided with slots $l$, located opposite and in line with each other and in line with the cord-slot in the body A and the slot $l'$ in the plate J, so that the binding-cord, when it enters the slot in the body A or binding-arm, must pass into the slots $l$ and $l'$, the slot $l$ adjacent to the plate J having a sufficient depth to allow the cord to pass to a point to be caught by the loop-hook on the end of the looper M.

The looper M is cylindrical in form, and has a central circular longitudinal opening corresponding in diameter to the diameter of the divided spindle N O, which is to be inserted therein and supported thereby. One end of this looper projects slightly beyond its end of the casing, and is screw-threaded to receive a beveled pinion, S, by means of which the looper is given an intermittent rotary movement, and the other end terminates within the casing L at a point slightly beyond the end of the deep slot $l$, and is provided with a head or enlargement, $m''$, which abuts against a shoulder formed in the case by the opening $l''$, which receives the head $m''$, and prevents end-play of the looper when the pinion S is attached to its end of the looper. On the end of the head $m''$ is located the loop-hook $m$, formed, as shown, by enlarging the interior opening at the end of the head $m''$, so as to leave a circular ring or shell, which ring or shell is not continuous, an opening being formed therein for the passage of the strands of the cord, so as to be caught by the edge or face of the shell at one side of the opening, which acts as a hook as the looper is revolved, and carries the strands around the interior of the case in the form of a loop, the strands lying in a groove or channel, $m'$, partly formed in the exterior face of the hook and partly in the interior face of the casing, as shown in Fig. 20, which channel prevents the cord from slipping away from the hook in forming the loop.

The spindle is made in two sections, one of which, N, has a longitudinal groove to receive the other section, O, the exterior faces of the sections having a cylindrical form and presenting a plain smooth surface for the revolution of the looper M, both sections having a reciprocating movement, and the section O having a reciprocating movement independent of the section N. The section N at one end is provided with a flange, which comes in contact with and rests on the face of the pinion S when the spindle is at rest, maintaining it in its proper relation to the looper M, and preventing it from being advanced or projected too far beyond the same end. The projecting or acting end of this section N is provided with a slot, $n''$, in which is pivoted the cord-catching finger $n$, having a cord catching and clamping point, $n'$, arranged in line with a jaw, $o'$, formed on the head $o$ at the end of the section O. The arm of this finger $n$ enters a recess or slot, $o''$, formed in section O, and is provided with an elongated slot, $n'''$, to receive a pin, $o'''$, on the section O, so that when the end of the section O is projected or advanced beyond the end of the section N the finger $n$ will be turned on its pivot, and the jaw $n'$ will be carried back or away from the jaw $o'$, opening the jaws and allowing the strands of the cord to enter, to be caught between them on the return of the section O, and the ends drawn through the loop by the withdrawal of the entire spindle. The inner face of the section O, at a point above the recess or slot $o''$, is provided with a groove, $p'$, corresponding in length to the length of independent stroke or play of the section, into which the end of a pin, $p$, on the section N projects to engage the end face of the slot and aid or assist in withdrawing the spindle, and to remove the strain on the arm of the finger and pin $o'''$ in such withdrawal.

The spring Q is located in a recess or slot in the end of the section N, so that one end will be in contact with the end face of the slot and the other in contact with a shoulder or head on the section O, and acts to prevent end-play of the section N when at rest, or during the revolution of the looper M, and maintains the section projected and the jaws closed while the loop is being formed. The construction and arrangement of the casing, the looper, and the spindle are shown in Figs. 20, 21, 22, and 23.

The link or pitman P is pivotally attached at one end to the end of the section O, and its other end is pivotally connected with the outer end of the crank X, the other end of which is attached or has formed thereon a journal or pivot, $x''$, which has its bearing in the body A, and projects through the body, and has attached to its projecting end a short crank or arm, $x$, on the outer end of which is an anti-friction roller, $x'$, so located and arranged as to engage the cam-groove $y''$ $y'''$ as the head E is revolved, the engagement of the roller with the curved or circular portion $y'''$ of the groove maintaining the crank $x$ depressed and stationary and preventing movement of the spindle, and its engagement with the inwardly and outwardly curved portion of the groove on the side of the wedge-point $y$ having the longest inclined face first depressing the lever X and advancing the section O to open the jaws $n'$ $o'$, and then raising the lever $x$ and receding this section and the entire spindle, withdrawing the projected end, the receding movement continuing until the point of $y$ is passed, when the inclined portion of the groove will act to return the lever to its normal position, to there remain while the roller passes around in the curved or circular portion $y'''$ of the groove.

The main driving-pinion R has its upper face provided with a series of cogs, $r$, to engage the cogs of the pinion S and cause it to make two complete revolutions at each revolution of the pinion R, a portion of the cogs being removed to leave a vacant space or delay-surface, $r'$, to prevent rotation of the pinion S at that point, and has its periphery or edge provided with a series of cogs, $s$, forming a cogged segment of sufficient length to engage the pinion T and cause it to make one complete revolution, and extending around the periphery of the pinion R from each end of the cogged segment is a flange or delay-surface, $s'$, which engages a delay-shoe, $t'$, formed by cutting away a portion of two of the cogs $t$ of the pinion T, so as to leave a plane face, and prevents revolution of the pinion after it leaves the cogged segment. The form of the pinion R and the arrangement of the cogs $r\ s$ and delay-surfaces $r'\ s'$ thereon are shown in Figs. 10 and 11, and the form of the pinion T, with its cogs $t$ and delay-shoe $t'$, is shown in Figs. 12 and 13. The pinion R is keyed or otherwise secured to a journal, $q$, which has its bearing in the body A, and projects through the body, and has attached to its projecting end the pinion $u$, having the delay-shoe $u'$, which pinion is located and arranged to mesh with the cogged segment $v$ and engage the delay-rim $v'$ on the head E, as before described, and give the pinion R an intermittent rotary movement.

The several devices or parts are timed as follows with reference to their movements in relation to each other and to the movement of the cord-carrying arm: When the arm is carrying the binding-cord around the bundle, all the devices will be at rest, or inoperative, the roller $w'$ being engaged with the circular face $z$ and the crank W held depressed by the spring V, with the free end of the bar or cord-catcher G elevated, retaining the jaws $a\ b$ open, the delay-shoe $t'$ of the pinion T being in engagement with the delay-surface $s'$ of the pinion R, with the pitman K K' receded and the head H at the limit of its return movement, and the plate I receded with the end of the cord caught, the delay-shoe $u'$ of the pinion $u$ being in engagement with the delay-rim $v$, preventing revolution of the wheel or pinion R and pinion $s$, and maintaining the looper M stationary, with the opening in the hook $m$ in line with the slots $l$ in the casing L, and the roller $x'$ being engaged with the circular portion $y'''$ of the groove formed by the flanges $y\ y'$, the crank X being depressed, with the spindle projected, and the jaws $n'\ o'$ closed, the section N being held down by the spring Q and the section O held up by the crank. The action of the binding-arm in carrying the cord around the bundle brings both tying-strands thereof into the slots $l$ in the casing L and the slot $l'$ in the plate J, and across the front and into the opening of the hook $m$ on the looper M, and beneath or one side of the projecting end of the spindle-sections N O, and across the end of the plate I and side of the head H, a strand passing either side of the horn $f$, as shown in Fig. 26, the cord being brought into this position as the arm completes its movement in carrying the cord around the bundle, the cord passing from the plate I, where its end is caught, through the opening $f''$, around the horn $f$, across the head H and plate I, through the slots $l\ l'$, across the end of the hook, and beneath or one side of the projecting end of the spindle, around the bundle, and thence back in the same manner outside of the horn $f$ to the spool. When the arm has brought the strands into the position described, the devices or parts will be brought severally into action. The roller $w'$ will pass up the inclined side or acting face of the cam $z'$, raising the lever W, receding the bar G, and closing the jaws $a\ b$, with the strands between them, gripping the strands between the bundle and the casing L, and preventing the weight or expansion of the bundle from withdrawing or pulling the strands from the tying devices, during which operation the other devices remain at rest, or inoperative. The roller $w'$ then passes onto the circular face of the cam $z'$, and remains in contact therewith until the knot is tied, keeping the bar G receded and the jaws $a\ b$ closed. As the roller $w'$ passes onto the circular face of the cam $z'$ the cogged segment $v$ engages the pinion $u$ and starts the wheel or pinion R, which imparts movement to the pinion S, causing it to revolve the looper M; and at the same time the cogs $s$ engage the cogs $t$ of the pinion T and impart movement thereto, causing it to revolve the eccentric disk U and advance the pitman K K' and rock the head H forward, the forward movement of the head advancing the plate I and releasing the end of the cord, simultaneously with the release of which the strands will have been caught between the face of the hook $m$ and the face of the casing L in the groove $m'$, to be carried around in the groove by the rotation of the looper M. The looper M continues to rotate until the delay-surface $r'$ on the pinion R is reached, when the movement of the pinion S and looper M momentarily ceases. In the meanwhile the rocking head H of the cord-holder is making its return-stroke, during which its horn $f$ hooks over the strand of cord extending from the looper to the cord-spool; and now, at the moment when the rotation of the looper is interrupted, this strand of cord is drawn against and along the cutting-edge of plate J by the hook $h$ of the moving plate I, and cut at the same time while it is being caught at a point between the cutter and the cord-spool between the said hook $h$ and the adjacent surface of the rocking head H. The rotation of the looper remains suspended until the cord has been thus cut off and caught by the cord-holder, so that these operations are performed without undue strain on the cord. As soon as the cord is severed the delay-surface $r'$ will have passed the pinion S, and the cogs $s$ will again engage the pinion and cause it to revolve the looper M, drawing the ends of the cord inside the casing L, and immediately, or soon after the looper commences to revolve, the head H will cease its return movement and come to a rest, the pinion T having made one complete revolution, and its delay-shoe $t'$ being engaged by the delay-surface $s'$, preventing further movement thereof until next operation. Just before the delay-surface $r'$ causes the looper M to cease its revolution, the roller $x'$, which during all this time has been in the circular portion $y'''$ of its groove, will enter the portion $y''$ thereof, causing the lever X, which has been depressed and at rest, to be slightly further depressed, advancing the section O of the spindle, throwing back the tail of the finger $n$ and opening the jaws $n'$ $o'$, the backward movement of the head of the finger pressing the strands drawn across its face back below the notch in the hook, out of the way of the strands carried by the hook. The section O will remain projected, keeping the jaws $n'$ $o'$ open until the hook $m$ has made one complete revolution and has commenced a second, carrying the strands between the jaws and over that portion held down by the tail of the finger $n$, crossing the strands. As the hook $m$ commences its second revolution, and has carried the ends of the strands held by it slightly beyond the jaws, the roller $x'$ will have passed to a point in its groove $y''$, where it acts to recede or raise the crank X, withdrawing the section O, raising the finger $n$, and closing the jaws upon the strands passing between them. The head E continues to revolve, causing the outwardly inclined portion of the groove $y''$ to act on the crank $x$ through the roller $x'$ and raise the crank X, gradually withdrawing the spindle as a whole, the two sections N O acting as one, and drawing the ends of the strands carried by the hook from engagement with the hook $m$ and through the loop which has been formed, the extent of the withdrawal being sufficient to draw the knot tight. Then as the head E continues to revolve, the incline of the groove $y''$ on the opposite side to where the roller entered acts on the crank $x$ through the roller $x'$ and depresses the crank X to its normal condition when at rest, the depressing of the crank X projecting the end of the spindle-sections N O to the position they occupy when the parts are inoperative, allowing the knot to escape and the bundle to be discharged, the circular portion of the groove engaging the roller $x'$ and maintaining the parts operated therefrom at rest. During the time the spindle is being withdrawn the wheel or pinion R continues to revolve, the segment $v$ being engaged with the pinion $u$, revolving the pinion S and imparting movement to the hook $m$, causing the hook to continue on its second revolution, and bringing it to a point where its opening is in line with the openings $l$, at which time the delay-rim $v'$ engages the delay-shoe $u'$ and stops the movement of the pinion R, which stoppage occurs as the crank X reaches its highest point of elevation, or near that time. As the crank X comes to a rest the roller $w'$, which has been engaged by the curved or circular face $z'$ of its cam, is disengaged by the passage of the face therefrom, allowing the spring V to act and throw the end of the crank W down, projecting and raising the end of the bar G, opening the jaws $a$ $b$, and allowing the bound bundle to be discharged. Then, as the head continues to revolve, all the parts will be locked or inoperative, as first described.

The operation will be readily understood from the foregoing description, each complete revolution of the head E actuating the several devices to sever and catch the cord, form the loop, draw the ends of the strand through the loop to complete the knot, to return the spindle, and allow the bundle to be discharged, the operation being automatic.

What I claim as new, and desire to secure by Letters Patent, is as follows:

1. In a cord-tying mechanism for binding grain, the cord-catcher G, having a reciprocating vibrating movement at its free end, and located between the bundle and the knot-tying devices, and provided at its free end with a jaw or catch, between which and a stationary jaw or catch the strands will be caught and held during the process of tying the knot, substantially as and for the purpose specified.

2. In a cord-tying mechanism for binding grain, the cord-catcher G, having its free end located and operating between the bundle and the knot-tying devices, and provided with a jaw or catch operating, in conjunction with a stationary jaw or catch, to clamp and hold the strands of the cord, in combination with the crank X, having a reciprocating movement for projecting and withdrawing the free end of G, to allow the strands to pass between the jaws and be clamped and held, substantially as specified.

3. In a cord-tying mechanism for binding grain, the cord-catcher G, having its free end provided with the cam-slot $c$ to receive the pin $c'$, and provided with the jaw $a$, operating, in conjunction with the jaw $b$ on the piece $b'$, to clamp and hold the strands of the cord, in combination with the crank X, journal or pivot $x''$, crank $x$, roller $x'$, and cam $z$ $z'$ on the revolving head E, for reciprocating the bar G and giving its free end a swinging or vibrating movement to allow the strands to pass between the jaws $a$ $b$, and caught and held, substantially as specified.

4. In a cord-tying mechanism for binding grain, the head H, having an oscillating or rocking movement and carrying the reciprocating plate I, having the point $h$ and opening $h'$, in combination with the stationary plate J, provided with a slot, $l'$, having a cutting-edge, against which the cord will be drawn and severed by the return movement of the head and the end caught between the face of the point $h$ and the adjacent face of the head H, substantially as specified.

5. In a cord-tying mechanism for binding grain, the combination and described arrangement of the head H, having an oscillating or rocking movement, the plate I, located in the recess $g$ of the head H, and provided with the point $h$ and opening $h'$, and having a reciprocating movement from the rock of the head, and the stationary plate J, provided with the slot $l'$, having a cutting-edge, and provided with the stud or projection $j$, located one side of the center of motion of the head and entering a recess, $i'$, in the plate I, to act as an eccentric to advance and recede the plate, the several devices acting to sever the main cord and catch the end thereof, substantially as specified.

6. In a cord-tying mechanism for binding grain, the head H, having an oscillating or rocking movement, and provided with a horn or hook, $f$, between which and the face of the head is an opening, $f'$, through which the cord will pass from the head, where its end is caught and doubled or passed around the horn $f$ to furnish the necessary length of ends to form the loop, substantially as and for the purposes specified.

7. In a cord-tying mechanism for binding grain, the adjustable pitman K K', having a reciprocating movement, in combination with the head H, plate I, having the point $h$ and opening $h'$, and stationary plate J, provided with the eccentric $j'$ for giving the head an oscillating or rocking movement and reciprocating the plate to sever and catch the end of the main cord, substantially as specified.

8. In a cord-tying mechanism for binding grain, the intermittingly-rotating wheel R, provided on its periphery with the gear-segment $s$ and delay-flange $s'$, and the pinion T, provided with the delay-shoe $t'$, and carrying the cranked disk U, in combination with the pitman K K', rocking head H, reciprocating plate I, and stationary plate J, all constructed, arranged, and operating substantially as and for the purpose specified.

9. The combination, substantially as before set forth, of the cord-holder, the cutter, and the rotating looper whose rotation is momentarily interrupted while the cord is forced into the holder and severed.

10. In a cord-tying device for binding grain, the casing or barrel L and looper M, in combination with the pinion S and wheel R, having cogs $r$ and a delay-surface, $r'$, on its face, and having an intermittent rotary movement for revolving the looper M to form the loop, and causing the looper to cease its revolution momentarily at the time the cord is being severed to prevent strain on the cord or the knotting mechanism, substantially as specified.

11. In a cord-tying mechanism for binding grain, the divided spindle N O, located and operating in the looper M, in combination with the pitman or rod P, crank X, journal $x''$, crank $x$, roller $x'$, and cam-groove $y''$ $y'''$, for rocking the crank X and advancing and receding the spindle as a whole, and also advancing and receding section O independently of the section N to open and close the jaws $n'$ $o'$, substantially as and for the purposes specified.

12. In a cord-tying mechanism for binding grain, consisting of a head, H, having an oscillating or rocking movement, a plate, I, having a reciprocating movement from the rock of the head H, a stationary plate, J, a casing or barrel, L, a looper, M, located and operating in the casing L and provided with a hook, $m$, and a reciprocating divided spindle N O, a pinion, R, having its periphery provided with a cogged segment, $s$, and a delay-surface, $s'$, and its face provided with the cogs $r$ and delay-surface $r'$, in combination with the pinion S, pinion T, provided with delay-shoe $t'$, eccentric or crank wheel U, and pitman K K' for driving the looper M and rocking the head H, substantially as described, and for the purposes specified.

13. In a cord-tying mechanism for binding grain, consisting of the reciprocating swinging cord-catcher G, the rocking or oscillating head H, reciprocating plate I, stationary plate J, casing or barrel L, looper M, provided with hook $m$, spindle N O, arranged and operating as described, the revolving head E, provided on its face with the cam-groove $y''$ $y'''$ and cam $z$ $z'$, and on its edge with the cogged segment $v$ and delay-rim $v'$, in combination with the stop-pinion $u$ and main driving-pinion R, constructed as described, cranks or arms $w$ and $x$, provided with anti-friction rollers $w'$ and $x'$, and cranks W and X for imparting movement to the several parts composing the tying mechanism at the proper time and in the proper relation to each other to do their respective work, substantially as set forth.

PLINY F. HODGES.

Witnesses:
O. W. BOND,
ALBERT H. ADAMS.